INVENTOR
Edward B. Nowosielski
BY F. B. Smith
ATTORNEY

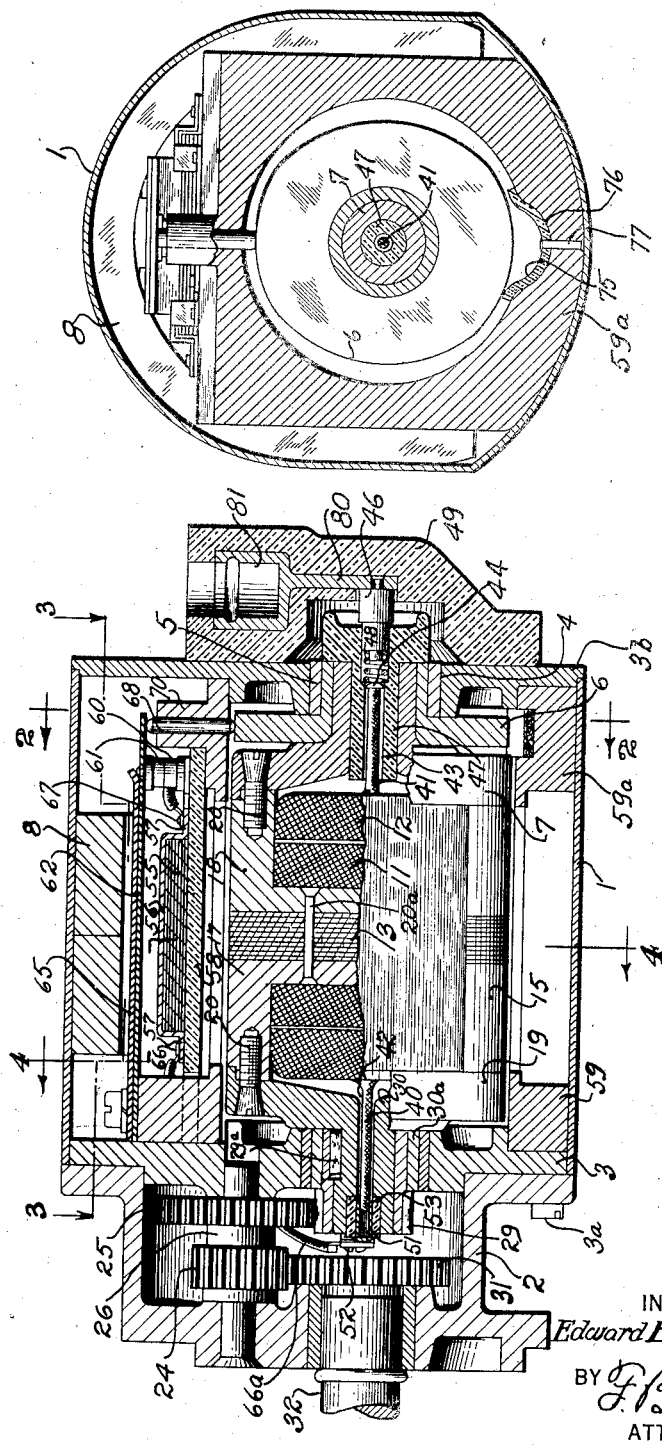

Patented June 20, 1933

1,915,030

UNITED STATES PATENT OFFICE

EDWARD B. NOWOSIELSKI, OF BLOOMFIELD, NEW JERSEY, ASSIGNOR TO ECLIPSE AVIATION CORPORATION, OF EAST ORANGE, NEW JERSEY, A CORPORATION OF NEW JERSEY

ELECTRICAL APPARATUS

Application filed November 29, 1930. Serial No. 499,072.

This invention relates to ignition dynamos commonly called magnetos, and particularly to magnetos adapted for use in the ignition system of internal combustion engines.

The object of the invention is to provide in a device of the foregoing character a novel construction and arrangement of component parts, the advantages of which novel construction and arrangement will appear from the following description, reference being had to the accompanying drawings wherein is illustrated the preferred embodiment of the invention. It is to be expressly understood, however, that the drawings are merely for the purpose of illustration and description and do not constitute a definition of the limits of the invention, reference being had to the appended claims for such a definition of the limits.

In the drawings,

Fig. 1 is a view in elevation, with parts in section, of a device embodying the invention;

Fig. 2 is a transverse sectional view taken along the line 2—2 in Fig. 1;

Figure 3:
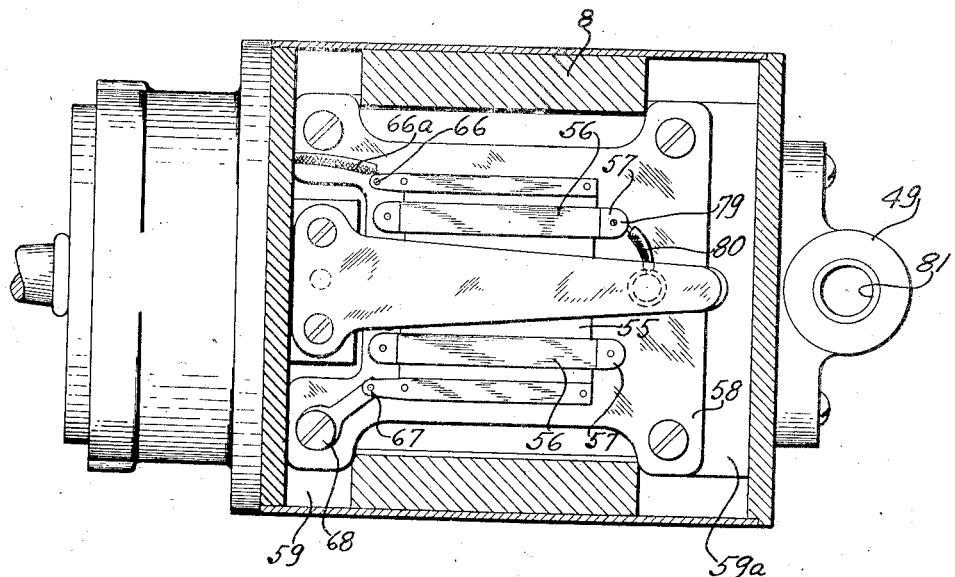
Fig. 3 is a horizontal view taken along the line 3—3 in Fig. 1.

The invention is shown embodied in an integral structure constituting a combined current generator, high tension inductor, condenser, and transmission gearing, the structure comprising a tubular member or sleeve 1 registering at one end with a double flanged member 2 secured to end plate 3 by suitable means such as screws 3a, the sleeve registering at the other end with a suitable end plate 3b having a bearing surface 4 for the reception of a sleeve or bushing 5 and a flanged cam plate 6, the whole constituting a bearing for the hollow shaft of the rotating element 7 attached to the rotor of the magneto generator the stator of which comprises a permanent field magnet 8 and the polar projections 9 and 10.

Figure 4:
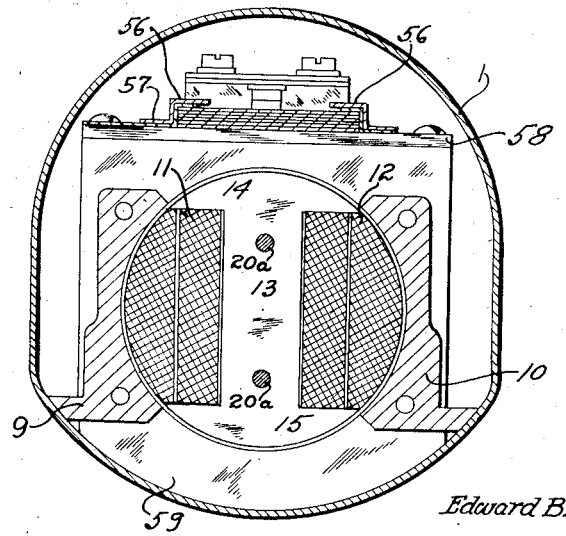
Fig. 4 is a transverse sectional view taken along the line 4—4 in Fig. 1.

As shown, the rotor comprises a primary coil 11 and secondary coil 12 wound about the core 13 which is preferably of laminated construction with end extensions 14 and 15 (Fig. 4) integral therewith, the assembly being held in place by the members 17 and 18 secured to the elements 7 and 19 by suitable means such as the screws 20, and secured to each other by rivets 20a.

The means for driving the rotor 19 from the engine at a suitably proportioned speed comprises a gear train mounted in the housing 2 so as to constitute with the generator, a composite self-contained unit. As shown, the speed multiplying mechanism comprises a pair of gears 24 and 25 on a shaft 26 extending through the outer end of member 2 and terminating in a bearing provided in the end plate 3, the gear 25 being adapted to mesh with the pinion 29 which is in turn keyed, as shown at 29a, to the extension 30, constituting a shaft for the rotor element 19, suitable bearing means therefor being provided, as shown at 30a. The gear 24 is in turn adapted to be driven by gear 31 on shaft 32 operatively connected with some member of the engine, (not shown).

The means for conveying the generated current to and from the windings of the coils preferably comprises a pair of flexible leads 40 and 41, passing through the centrally disposed passages 42 and 43, respectively, formed in the members 7 and 19; a sleeve 47 of suitable insulating material being provided to protect the current passing from the conductor 41 to the contact brush 46, the latter being normally held out of physical engagement with the button 44, (although electrically connected therewith) by suitable means such as the coiled spring 48. The brush 46 is in constant contact with the lower end 80 of cup 81, the latter being intended to receive the lead wire connecting with the combustion chamber of the engine. The conductor 40 is adapted to be in current conducting engagement with the sleeve 51 connecting with the terminal 52, a suitable insulating member 53 being provided to protect the current.

The means for mounting the condenser element 55 preferably comprises a pair of straps or cover plates 56, each having toe pieces 57 secured to the supporting plate 58 of insulating material, the plate 58 being adapted to rest at one end upon the upper surface of member 59a. One end of the plate 58 is provided with an upwardly extending contact stud 60, mounted near the end of the flexible cantilever member 62. The other end of the member 62 is secured to the elements 59, the spring 65 being provided to exert a pressure normally tending to hold members 60 and 61 in contact. One of the terminals 66 of the condenser is connected as by lead 66a to the terminal 52 of the primary circuit and the other, 67, to a suitable grounding means 68.

The means for periodically interrupting the circuit through the members 60 and 61 to create the desired high tension current in the secondary circuit comprises a vertically disposed pin 68, slidable in the boss 70 extending from the upper surface of member 59a, the pin 68 being adapted to rest upon the peripheral surface of the cam member 6, the latter being held firmly to member 7, for rotation therewith. As shown, the member 6 is preferably formed with an elliptic or oblate cylindrical surface by virtue of which the periodic lifting movements imparted to the member 68 are of a firm and smooth nature and free from the "jumpy" impulses and the resulting uncertain operation caused by the use of sharper and more abrupt cam surfaces; and at the same time this smoother action is obtained without sacrificing the desirable quality of promptness in the curernt interrupting action.

From an inspection of Fig. 2, it will be apparent that upon each revolution of the cam member 6, there will be two upward movements of the pin 68, each of which will cause an opening of the circuit to the primary coil 11, at the contacts 60 and 61, thereby causing the induction of a high tension current in the secondary windings 12, (by virtue of the shunt circuit passing through the condenser 55) and a resultant charge igniting spark of considerable duration in the combustion chamber of the cylinder (not shown).

Novel means are also provided for maintaining the cam member 6 properly lubricated so as to prevent undue wear or heating of the members 6 and 68. As shown, such means comprises a wick member 75, of suitable material such as felt, adapted to be retained in the recess or pocket 76 formed in the member 59a by the provision of a suitable retaining means such as shown in 77, the felt pad 75 having one end adapted to rub against the surface of the cam member 6, and maintain the same supplied with lubricant carried from pocket 76 to the wick 75 by capillary action.

Attention is particularly directed to the novel means for connecting the contacts 60 and 51 in the primary circuit without the use of the usual long lead to the primary winding. As shown such means comprises a terminal 79 formed on the toe 57 of condenser strap 56, to which terminal the short lead 80 is attached, the other end thereof being secured to the stud 60. By this arrangement, the wiring is simplified, and space is conserved. Likewise, the use of the single set of supporting members 59 and 59a to support both the condenser assembly and the end plates 3 and 3b, and also constitute the mounting means for the circuit interrupting mechanism, makes it possible to house virtually the entire ignition mechanism in an unusually small space. The invention is therefore of great merit as an ignition device for use on aeroplanes and on other automotive vehicles where but little space is available and weight is objectionable.

Another important saving in space and weight without sacrificing accessibility, is achieved by the use of the novel means for housing the gear train in a unit of dimensions corresponding to those of the magneto proper, which units can readily be removed or inspected. The same accessibility characterizes the means for housing the high tension contact members 46 and 46a; it being understood, however, that other suitable means may be employed for distributing the electric impulses to the several cylinders of the engine in proper sequence.

Likewise other changes, which will now suggest themselves to those skilled in the art, may be made in the form, details of construction and arrangement of the parts, without departing from the scope of the invention, and reference is therefore to be had to the appended claims for a definition of the limits of the invention.

What is claimed is:

1. In a device of the class described, in combination with a rotating current generating element, a pair of end plates adapted to support the shaft of said rotating element, a driving member and a gear train connecting said driving member with said rotating elements, a cam movable with said rotating element, a switch movable to circuit opening position by said cam, a condenser and holding means for said condenser electrically connected to said switch, a single supporting means for said condenser holding means, switch and one of said end plates, and enclosure means for said gear train secured to the other of said end plates.

2. In a device of the class described, in combination with a rotating current generating element, a pair of end plates adapted to support the shaft of said rotating element, a cam movable with said rotating element, a switch movable to circuit opening position by said cam, a cam follower reciprocable to actuate said switch, means for maintaining the surface of said cam lubricated, and a single supporting means for said lubricating means, and one of said end plates, said supporting means comprising a member apertured longitudinally to receive said cam, and transversely to receive said cam follower, and further recessed to provide a reservoir from which lubricant is fed to said cam surface.

3. In a device of the class described, in combination with a rotating current generating element, supporting means for said rotating element, a switch carried by said supporting means, a cam mounted on said rotating element, a cam follower reciprocable by said cam to operate said switch lubricating means directly contacting said switch actuating cam, and unitary supporting means for said switch, lubricating means and rotating element, said supporting means comprising a member apertured longitudinally to receive said cam and transversely to receive said cam follower, and further recessed to provide a reservoir from which lubricant is fed to said cam surface.

4. In a device of the class described, in combination a rotating current generating element, supporting means for said rotating element including a pair of end plates, a switch actuating cam carried by said rotating element, a switch adjacent said cam and a single supporting member for said cam, switch and one of said end plates, said supporting member being formed to provide for the retention of a quantity of lubricant, and means secured to said supporting member for feeding said lubricant to the surface of said cam.

5. In a device of the class described, in combination with a rotating current generating element, a pair of end plates adapted to support the shaft of said rotating element, a driving member and a gear train connecting said driving member with said rotating elements, a cam movable with said rotating element, a switch movable to circuit opening position by said cam, a single supporting means for said switch and one of said end plates, and enclosure means for said gear train secured to the other of said end plates.

In testimony whereof I have signed this specification.

EDWARD B. NOWOSIELSKI.